(12) United States Patent
Ho et al.

(10) Patent No.: US 8,098,861 B2
(45) Date of Patent: Jan. 17, 2012

(54) BATTERY COMPARTMENT DOOR

(75) Inventors: Wai Kit David Ho, Singapore (SG);
Wee Haw Koo, Singapore (SG); Beng Hai Tan, Singapore (SG)

(73) Assignee: Siemens Audiologische Technik GmbH, Erlangen (DE)

( * ) Notice: Subject to any disclaimer, the term of this patent is extended or adjusted under 35 U.S.C. 154(b) by 1002 days.

(21) Appl. No.: 11/990,677

(22) PCT Filed: Aug. 20, 2005

(86) PCT No.: PCT/SG2005/000285
§ 371 (c)(1),
(2), (4) Date: Feb. 19, 2008

(87) PCT Pub. No.: WO2007/024194
PCT Pub. Date: Mar. 1, 2007

(65) Prior Publication Data
US 2009/0252359 A1    Oct. 8, 2009

(51) Int. Cl.
*H04R 25/00* (2006.01)
(52) U.S. Cl. .................................... 381/323
(58) Field of Classification Search .......... 381/322–324; 49/70
See application file for complete search history.

(56) References Cited

U.S. PATENT DOCUMENTS
| 4,598,177 A | 7/1986 | McGroarty |
| 5,675,657 A | 10/1997 | Giannetti |
| 6,144,749 A | 11/2000 | Fideler |

FOREIGN PATENT DOCUMENTS
| EP | 0 684 749 A | 7/1999 |
| EP | 1 435 758 A1 | 7/2004 |
| JP | 03 141551 A | 6/1991 |
| JP | 03141551 A * | 6/1991 |
| JP | 08 185843 A | 7/1996 |

* cited by examiner

*Primary Examiner* — Elvin G Enad
*Assistant Examiner* — Andrew R Millikin

(57) ABSTRACT

A battery compartment door for an electronic device, said door being operable between open and closed conditions of use with respect to the device, including a cradle shaped to at least partially receive a terminal of a battery, wherein the cradle is adapted to electrically couple the terminal to an electric circuit of the device when the door is arranged in the closed condition of use.

18 Claims, 5 Drawing Sheets

BATTERY COMPARTMENT DOOR

CROSS REFERENCE TO RELATED APPLICATIONS

This application is the US National Stage of International Application No. PCT/SG2005/000285, filed Aug. 20, 2005 and claims the benefit thereof. The application is incorporated by reference herein in its entirety.

TECHNICAL FIELD OF THE INVENTION

The present invention relates to a battery compartment door for an electronic device.

BACKGROUND OF THE INVENTION

A hearing aid device, for example, typically includes an electric circuit powered by a battery. The electric circuit normally includes two electrically conductive metal contacts that are arranged for engagement with the negative and positive terminals of the battery.

The metal contacts are typically more expensive than injection moulded components, for example. As such, the metal contacts may increase the cost of production of hearing aid devices. Further, the metal contacts have a tendency to corrode over time which sometimes leads to device failure. Once again, the metal contacts are relatively expensive components. As such, the cost of replacing corroded metal contacts may be expensive.

It is generally desirable to overcome or ameliorate one or more of the above mentioned difficulties, or at least provide a useful alternative.

SUMMARY OF THE INVENTION

In accordance with one aspect of the present invention, there is provided a battery compartment door for an electronic device, said door being movable between open and closed positions and including a cradle which at least partially receives a terminal of a battery and electrically couples the terminal to an electric circuit of the device when the door is in the closed position.

Preferably, a section of the cradle that at least partially receives said terminal of the battery is at least partially made of an electrically conductive polymer.

Preferably, said section of the cradle is a tubular member shaped to at least partially receive said terminal of the battery.

In accordance with the present invention there is also provided a battery compartment door for electrically coupling a terminal of a battery to a corresponding electrically conductive contact of an electric circuit of an electronic device, including a cradle shaped to at least partially receive said terminal of the battery, wherein said coupling is effected when an outer peripheral surface of the cradle engages the said contact.

Preferably, the cradle is made of an electrically conductive polymer.

In accordance with another aspect of the present invention, there is provided an electronic device including an electric circuit and a battery compartment door being movable between open and closed positions, said door including a cradle which at least partially receives a terminal of a battery and electrically couples said terminal with an electrically conductive contact of the electric circuit when the door is in the closed position.

Preferably, the electric circuit includes an electrically conductive contact arranged to electrically couple another terminal of the battery when said door is in said closed position.

Preferably, a section of the cradle that at least partially receives said terminal of the battery is at least partially made of an electrically conductive polymer.

Preferably, said section of the cradle is a tubular member shaped to at least partially receive said terminal of the battery.

BRIEF DESCRIPTION OF THE DRAWINGS

Preferred embodiments of the present invention are hereafter described, by way of non-limiting example only, with reference to the accompanying drawing in which.

DETAILED DESCRIPTION OF PREFERRED EMBODIMENTS OF THE INVENTION

Figure 1:
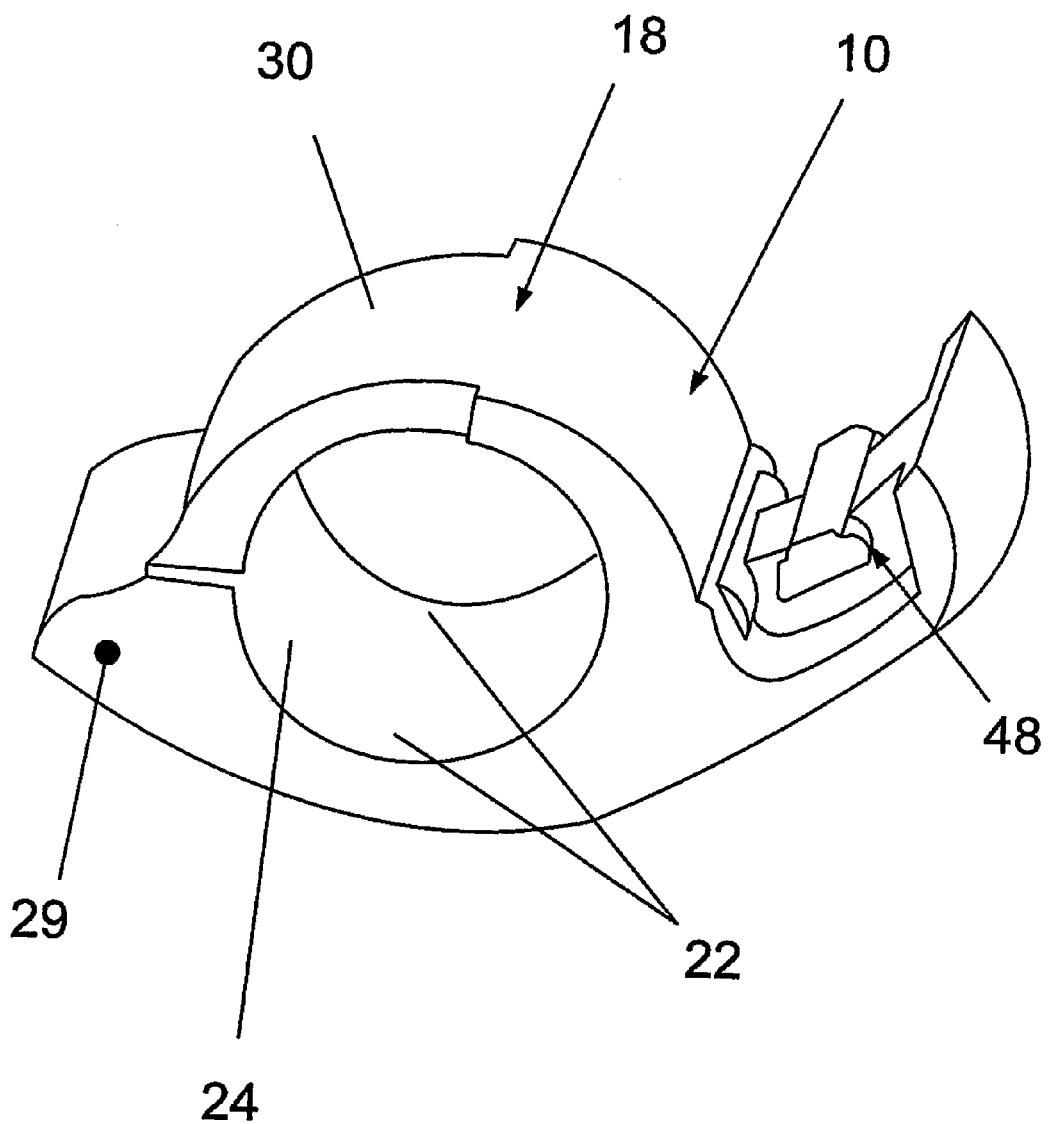
FIG. 1 is a perspective view of a battery compartment door.
Figure 2:
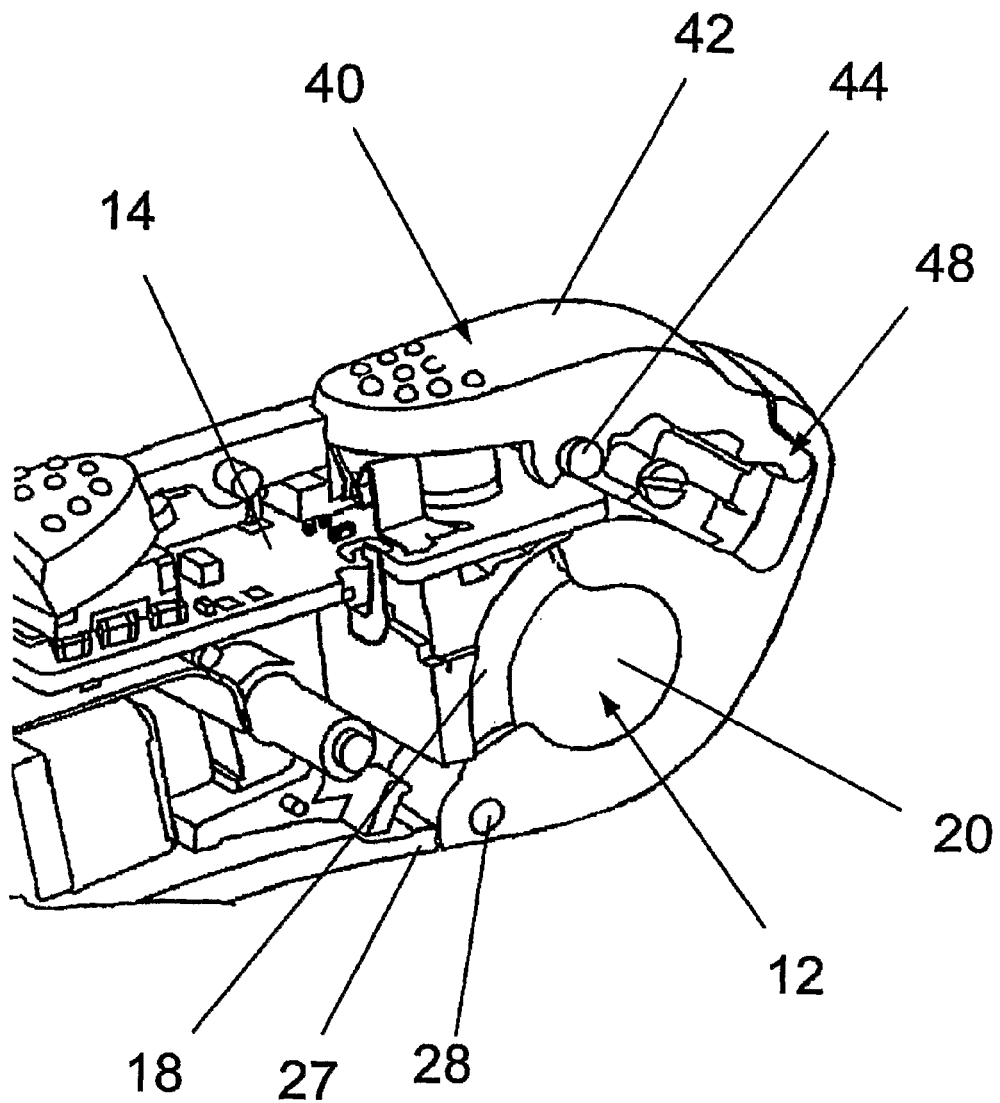
FIG. 2 is a left side perspective view of an electronic device with a section of the casing removed so as to show some of the internal components of the device.
Figure 3:
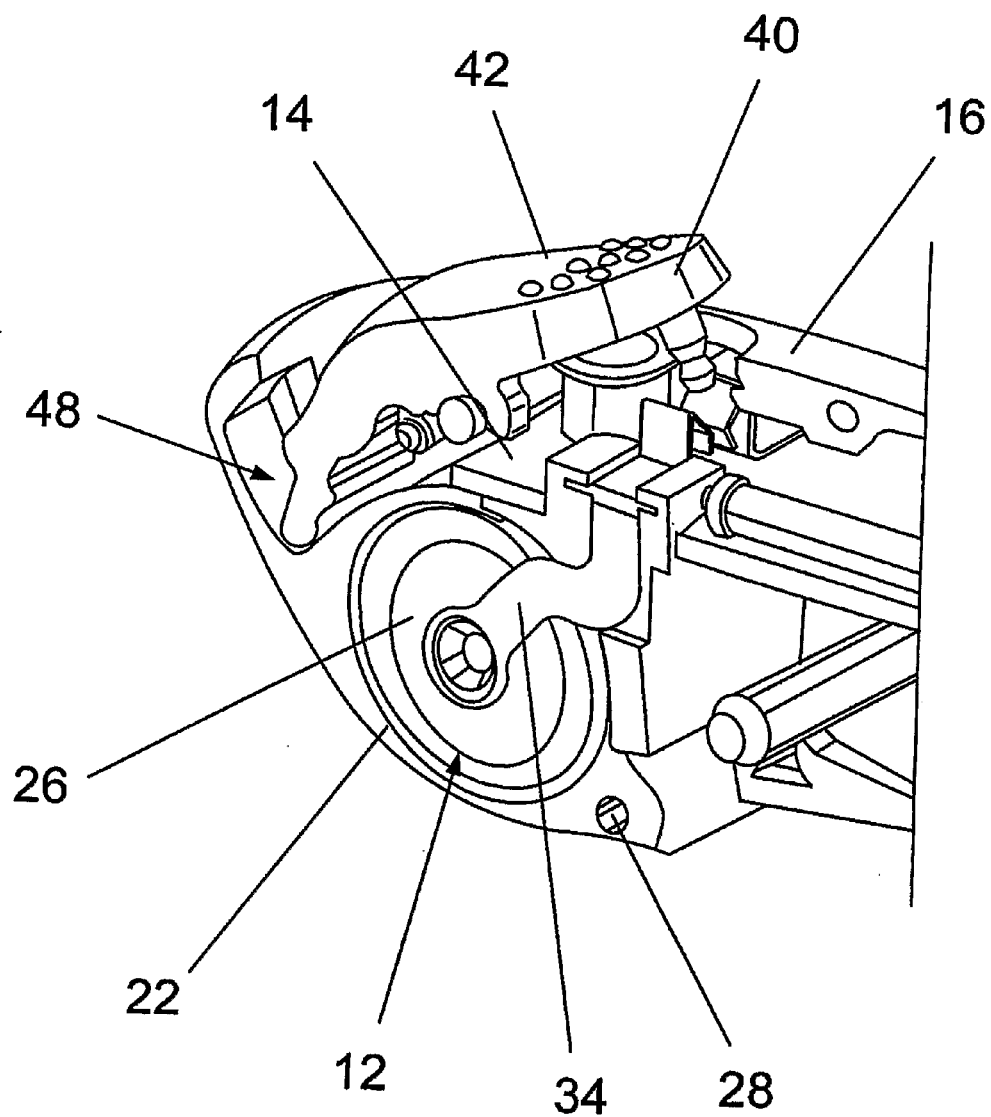
FIG. 3 is a right side perspective view of the electronic device shown in FIG. 2 arranged in another condition of use with a section of the casing removed so as to show some of the internal components of the device.

The battery compartment door 10 shown in FIG. 1 is used to locate a battery 12 inside a hearing aid device 16 for electrical connection to an electric circuit 14, as shown in FIGS. 2 and 3. Preferred embodiments of the battery compartment door 10 are hereafter described with reference to the hearing aid device 16. However, the battery compartment door 10 can be used to locate the battery 12 inside any other suitable electronic device.

The battery compartment door 10 includes a tubular cradle 18 that is open at both ends 22. The cradle 18 is shaped to receive a positive terminal end 20 of the battery 12 through either open end 22. The tubular sidewall of the battery 12 corresponds to the shape of the inner tubular surface 24 of the cradle 18 and the battery 12 is secured in the cradle 18 by frictional engagement.

The battery 12 is a standard button watch battery that is generally cylindrical in shape. The positive terminal of the battery 12 includes an end 20 of the battery 12 and a cylindrical sidewall. The negative terminal of the battery is located on the other end 26 of the battery 12.

A section of the cradle 18, including the inner tubular surface 24 and the upper section 30, is preferably wholly or partly made of an electrically conductive polymer. The electrically conductive polymer is preferably a mixture of polymer (PC/PA/PBT/PMMA or PE) and reinforced by metal powder, carbon. Alternatively, said section of the cradle 18 is wholly or partly made any suitable electrically conductive material. When a battery 12 is inserted into the cradle 18 in the above-described manner, the positive terminal 20 of the battery 12 is in electrical communication with the electrically conductive inner tubular surface 24 of the cradle 18. The cradle 18 is thereby electrically coupled to the positive terminal 20 of the battery 12. The negative terminal 26 of the battery 12 is electrically connected to existing metal contact 34 that extends from the electric circuit 14 towards the battery compartment door 10 when the door 10 is closed. Preferably, the cradle 18 is electrically isolated from the negative terminal end 26 of the battery 12. The other parts of the battery compartment door 10 are made of a non-conductive material such as ABS or PP.

Figure 4:
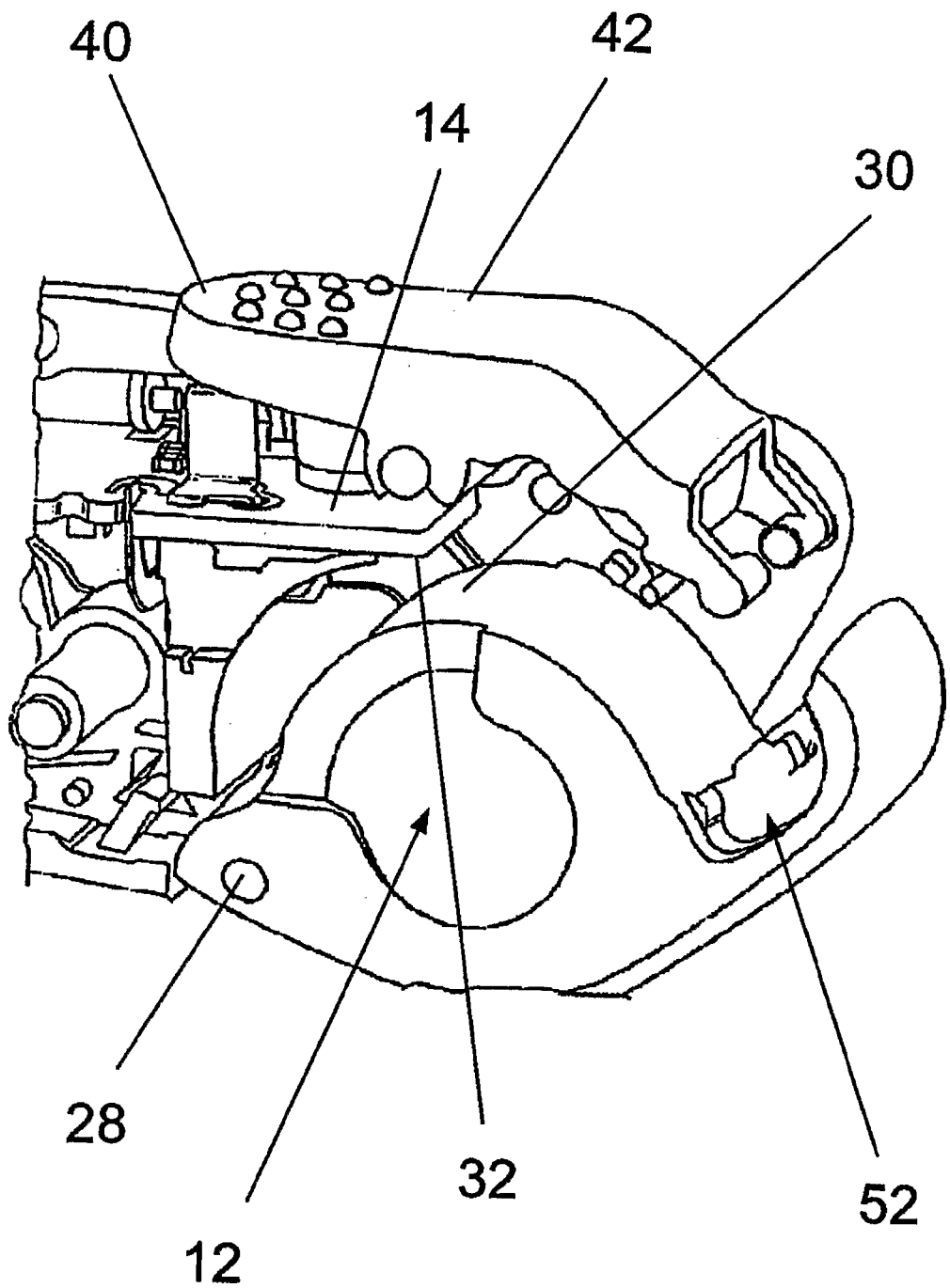
FIG. 4 is a left side perspective view of the electronic device shown in FIG. 2 arranged in another condition of use.

The battery compartment door 10 is hingedly connected to a bottom section 27 of the device 16 by an axle 28 that extends through an aperture 29 in the door 10. The door 10 can rotate about the axle 28 so as to move towards and away from a main body of the device 16. The battery 12 can be loaded into the cradle 18 of the door 10 by rotating the door 10 away from the body of the device 10 to an open position, as shown in FIG. 4. In doing so the cradle 18 becomes accessible and the battery can by inserted in the above described manner. Alternatively, the battery compartment door 10 can be removed from the axle 28 so that the battery can be loaded into the cradle 18.

Figure 5:
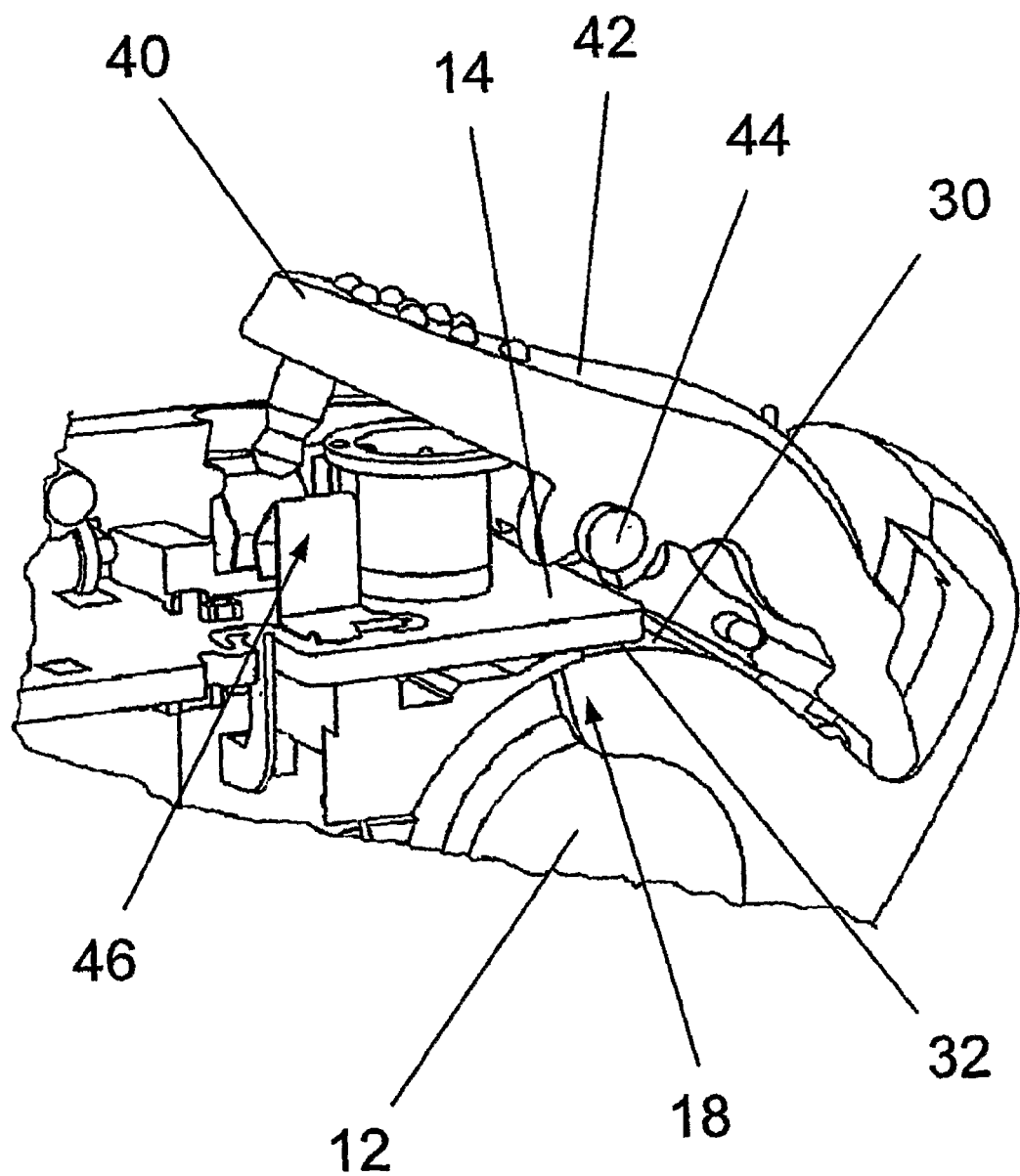
FIG. 5 is a left side perspective view of the electronic device shown in FIG. 2 arranged in yet another condition of use.

Rotation of the door 10 about the axle 28 towards the main body of the device 10 is limited by an upper section 30 of the cradle 18 contacting a lower section 32 of the electric circuit 14, as shown in FIGS. 4 and 5. The door 10 is arranged in a closed position when the upper section 30 of the cradle 18 abuts the lower section 32 of the electric circuit 14.

The lower section 32 of the electric circuit 14 includes an electrically conductive contact (not shown) that is positioned to electrically engage the electrically conductive upper section 30 of the cradle 18 when the door 10 is closed. The electrically conductive upper section 30 of the cradle is electrically coupled to an electrically conductive section of the cradle that at least partially receives the positive terminal 20 of the battery 12. These sections of the cradle 18 are electrically coupled together by any suitable means. Preferably, the electrically conductive upper section 30 of the cradle 18 and the electrically conductive section of the cradle 18 that at least partially receives the positive terminal 20 of the battery 12 form part of the cradle 18. Preferably, the cradle 18 is made wholly or partly of an electrically conductive material such as an electrically conductive polymer, for example. The electrically conductive polymer is preferably a mixture of polymer (PC/PA/PBT/PMMA or PE) and reinforced by metal powder, carbon.

The electric circuit 14 is thereby electrically coupled to the positive terminal 20 of the battery 12 when the battery door is closed in the described manner. The electric circuit 14 of the device 16 also includes an electrically conductive metal contact 34 that extends from the electric circuit 14 towards the battery compartment door 10. The contact 34 is may, alternatively, be made of a non-metallic electrically conductive material which can include, for example, electrically conductive polymer or plastic material. The contact 34 may be made of any suitable shape, whether regular or irregular, depending on the design of the door 10. The contact 34 is arranged so that it engages the negative terminal 26 of the battery 12 when the battery compartment door 10 is closed, as shown in FIG. 3.

The battery compartment door 10 electrically connects the positive and negative terminals of the battery 12 to the electric circuit 14 of the hearing aid device 16 when the door 10 is arranged in the closed position. The battery compartment door 10 is secured in the closed position for electrical communication with the electric circuit 14 of the hearing aid device by any suitable means. An example of a suitable locking means is described out below.

The hearing aid device 16 includes a switch 40, as shown in FIG. 5, that is used to turn the electric circuit 14 on and off. The switch 40 includes an on/off cover 42 that is rotatable about an axle 44 so as to move between on and off positions that respectively close and open an electric gate 46 of the electric circuit 14.

The on/off cover 42 is also mechanically coupled to a battery compartment door 10 by the locking means 48 shown in FIGS. 2 to 5. The mechanical connection between the on/off cover 42 and the battery compartment door 10 holds the door 10 in the closed position and thereby holds the cradle 18 in electrical communication with the contact (not shown) of the lower section 30 of the electric circuit 14. The on/off cover 42 and the battery compartment door 10 are mechanically coupled together such that the battery compartment door 10 cannot be readily opened unless the on/off cover 42 is first arranged in the off position. The battery compartment door 10 is thereby securely held in the closed position.

The various components of the battery compartment door 10 are injection moulded from plastic material such as Acrylonitrile Butadiene Styrene (ABS).

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

Claims defining the invention are as follows:

1. A battery compartment door movable between an open and a closed position for an electronic device, comprising:
    a cradle that at least partially receives a terminal of a battery and electrically couples the terminal to an electric circuit of the electronic device when the door is in the closed position,
    wherein a section of the cradle is at least partially made of an electrically conductive polymer.

2. The battery compartment door as claimed in claim 1, wherein the section of the cradle is a tubular member shaped to at least partially receive the terminal of the battery.

3. The battery compartment door as claimed in claim 2, wherein the tubular member is shaped to electrically engage the terminal of the battery.

4. The battery compartment door as claimed in claim 1, wherein an electrically conductive section of an outer peripheral surface of the cradle engages an electrically conductive contact of the electric circuit when the door is in the closed position and is electrically coupled to the section of the cradle.

5. The battery compartment door as claimed in claim 1, wherein the cradle is made of an electrically conductive polymer.

6. The battery compartment door as claimed in claim 1, further comprising an aperture that hingedly couples the door to the electronic device so that the door can rotate between the open position and the closed position.

7. The battery compartment door as claimed in claim 1, further comprising a device that locks the door to the electronic device in the closed position so that the cradle electrically communicates with the electric circuit of the electronic device.

8. The battery compartment door as claimed in claim 1, wherein the electronic device is a hearing aid.

9. A battery compartment door for electrically coupling a terminal of a battery to a corresponding electrically conductive contact of an electric circuit of an electronic device, comprising:
    a cradle that at least partially receives the terminal of the battery and electrically couples the terminal of the battery to the electrically conductive contact when an outer peripheral surface of the cradle engages the contact,
    wherein a section of the cradle is at least partially made of an electrically conductive polymer.

10. An electronic device, comprising:
   an electric circuit;
   a battery compartment door that moves between an open and a closed position; and
   a cradle comprised in the battery compartment door that at least partially receives a terminal of a battery and electrically couples the terminal with an electrically conductive contact of the electric circuit when the door is in the closed position,
   wherein a section of the cradle is at least partially made of an electrically conductive polymer.

11. The electronic device as claimed in claim 10, wherein the electric circuit comprises another electrically conductive contact to electrically couple with another terminal of the battery when the door is in the closed position.

12. The electronic device as claimed in claim 10, wherein the section of the cradle is a tubular member shaped to at least partially receive the terminal of the battery.

13. The electronic device as claimed in claim 12, wherein the tubular member electrically engages the terminal of the battery.

14. The electronic device as claimed in claim 10, wherein a section of an outer peripheral surface of the cradle engages the electrically conductive contact of the electric circuit when the door is in the closed position.

15. The electronic device as claimed in claim 10, wherein the door is hingedly coupled with the electronic device so that the door can rotate between the open position and the closed position.

16. The electronic device as claimed in claim 10, further comprising a device that locks the door to the electronic device in the closed position so that the cradle electrically communicates with the electric circuit of the electronic device.

17. The electronic device as claimed in claim 10, wherein the electrically conductive contact is made of a metallic material or an electrically conductive polymer.

18. The electronic device as claimed in claim 10, wherein the electronic device is a hearing aid.

* * * * *